(12) United States Patent
Schnell et al.

(10) Patent No.: US 6,231,394 B1
(45) Date of Patent: May 15, 2001

(54) CONTACTS CARRIER

(75) Inventors: Thomas Schnell, Heilbronn; Gerhard Braun, Bretzfeld-Bitzfeld, both of (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/343,533

(22) Filed: Jun. 30, 1999

(30) Foreign Application Priority Data

Jul. 2, 1998 (DE) .............................. 198 29 551

(51) Int. Cl.[7] .................................................. H01R 24/00
(52) U.S. Cl. ............................................ 439/630; 439/862
(58) Field of Search .................................. 439/630, 280, 439/862, 637, 81

(56) References Cited

U.S. PATENT DOCUMENTS

| 5,527,192 | 6/1996 | Juret | 439/862 |
|---|---|---|---|
| 5,609,502 | * 3/1997 | Thumma | 439/637 |
| 5,746,626 | 5/1998 | Kwiat et al. | 439/630 |
| 5,775,949 | * 7/1998 | Bricaud et al. | 439/630 |
| 5,800,200 | * 9/1998 | Brioaud et al. | 439/630 |
| 5,807,124 | * 9/1998 | Bricaud et al. | 439/260 |
| 5,980,323 | * 11/1999 | Bricaud et al. | 439/630 |

FOREIGN PATENT DOCUMENTS

| 41 18 312 | 3/1995 | (DE) | G06K/7/06 |
|---|---|---|---|
| 44 11 345 | 5/1995 | (DE) | G06K/7/01 |

* cited by examiner

*Primary Examiner*—Tulsidas Patel
(74) *Attorney, Agent, or Firm*—Blank Rome Comis & McCauley, LLP

(57) ABSTRACT

A contacts carrier has several contacts. Each contact has a spoon-shaped, arched contact portion that projects beyond a first surface of the contacts carrier. At least one guide portion of each contact is joined to the respective contact portion and is designed and guided in the contacts carrier. Specifically, the contacts are movable substantially in a vertical direction through a vertex of the respective contact portion.

15 Claims, 3 Drawing Sheets

CONTACTS CARRIER

FIELD OF THE INVENTION

The invention refers to a contacts carrier having several contacts, as being used, for example, within a smart card reader.

DESCRIPTION OF THE RELATED ART

Usually, the contacts are formed having one end for contacting associated conducting paths of a printed circuit associated to the contacts carrier and having their other free end projecting beyond the surface of the contacts carrier, facing an associated smart card.

Such contacts carriers as well as associated smart card readers and smart cards are known from the prior art (DE 41 18 312 C2; DE 44 11 345 C1).

Here, the contacts are designed like a leaf spring and are deformed in a bridge-like fashion at their contact end facing the smart card.

Smart card readers are intended to contact the contacts of the electronic chip disposed on an associated smart card in a given (end) position of the card within the reader, in order to make "reading" the information of the chip, but also, optionally, inputting information into the chip card thus possible.

Smart card readers of the said type are used, for example, in stationary chip-card telephones, mobile phones, automatic cash dispensers or the like.

Usually, only very little space is provided for the contacts carrier and the associated contacts in those applications. That applies especially for such contacts carriers which are contacted by very small cards, for example so-called SIM cards.

In the DE 94 07 499 U1 (corresponding to US 5,527,192 A) an electrical contact element is proposed, the contact portion of which is formed having an arched shape in two directions, a "spoon-like" geometry resulting thereby for the contact portion, because of which those contacts are also called "spoon contacts". That geometrical design of the contact zones of the contacts provides an increased reliability of contact. But it is of disadvantage that the contact portions having a convex shape in two directions form the free contact ends and insofar have a certain stability in the axial direction of the respective joined guide portion, at most.

However, the geometric conditions mentioned at the beginning in the use of such contacts carriers require from case to case to move an associated smart card not only in the axial direction of the guide portions of the contacts but also in other directions, for example offset by 90° or 180°.

Insofar, it is an object of the invention to provide a contacts carrier of the type mentioned at the beginning, which, having a small structural shape, makes a high reliability of contact possible, even in different supply positions of a smart card.

The invention starts out from the reflection that the "spoon contacts" described above are basically suitable for that with respect to their contact portions having a double convex shape, because those contacts provide run-on surfaces "all around" for an associated smart card and its contacts.

However, starting out from the object mentioned above it is necessary to fabricate the contacts in the contacts carrier in such a manner that they are movable substantially in the orthogonal direction only, with respect to the plane, along which the smart card is supplied. This direction may also be defined by the orientation of an axis which extends through the respective vertex of the spoon-shaped contact portions of the contacts.

In that respect, the invention has furthermore recognized that a corresponding guide of the other contact portions is necessary within the contacts carrier.

SUMMARY OF THE INVENTION

Accordingly, it its most general embodiment, the invention refers to a contacts carrier having several contacts, each of which having a spoon-like arched contact portion projecting beyond a first surface of the contacts carrier, wherein at least one guide portion of each contact, joined to the respective contact portion is shaped and guided in the contacts carrier in such a manner that the contacts are movable along an (imaginary) axis only, extending substantially in a vertical direction through a vertex of the respective contact portion.

Concretely, this may be effected according to an embodiment in that the contacts are formed at one side of the contact portion having a first guide portion being positioned within a first guide seat of the contacts carrier, which guides the corresponding contact in a direction extending orthogonally to the axis extending through the vertex of the contact portion, and are formed in a prolongation of the first guide portion and at the opposite side of the contact portion having a second guide portion positioned within a second guide seat of the contacts carrier, which guides the corresponding contact in a direction orthogonal to the guiding direction of the first guide portion but in the same plane.

From that and starting out from a system of coordinates x, y, z, a guiding (fixing) in the x- and the y-direction of the respective guide portions substantially without play but a movability (springiness) in the z-direction of the contacts (contact portions) result.

Thereby, it becomes possible to supply a smart card in any direction with respect to the arrangement of contacts without there being a risk that the contacts are moved (displaced) in a plane in parallel to the orientation of the smart card. Rather, the direction of movement of the contacts (contact portions) is limited to a direction extending orthogonally (normally) to the surface of the contacts carrier or the smart card.

The guide portion formed at the free end of the contacts may extend orthogonally to the guide portion formed on the other side of the contact portion, for example, so that the respective contact, at its contact end, is essentially T-shaped in plan view.

Correspondingly, recesses or guiding slots are formed in the contacts carrier for the respective contacts (guide portions). The contacts may in addition be slidably guided or fixed mechanically outside their contact and guide portions to provide an additional distortion and removal safety.

Furthermore, the upper surface of the transversal free (second) guide portion, for example biassed (in the direction towards the smart card), may be positioned against corresponding stops in the housing in the contacts carrier.

Such an embodiment is shown in the description of the figures below.

Said bias of the contacts in the region of the contact portions, in addition to the geometric design of the contact portions and the guide portions joined thereto, provides a high functional reliability of a contacts carrier designed accordingly.

That bias can be adjusted in a particularly simple way, if the contacts have a meander-like shape starting from their end having the contact portion. In assembly, they may then be inserted in the contacts carrier in such a manner that the contacts having a meander-shaped portion at the end may be pressed into a corresponding seat of the contacts carrier and a bias is effected at the same time, for example by biassing the second guide portion disposed at the free end of the contacts along corresponding portions of the contacts carrier.

The contacts may also be positioned in the contacts carrier outside their contact and guide portions through catch means. In this case, the contacts are subsequently inserted mechanically into the contacts carrier. But it is also possible to insert (to injection-mould) the contacts (all around) in producing the contacts carrier usually consisting of an (electrically insulating) synthetic material.

Between the connecting region of the contact portion and the opposite second end, the contacts may be widened, the lifetime, distortion safety and force gradient being improved thereby.

That design can be realized to advantage in all U-shaped contacts. Then, the joining leg is wider with respect to the two free legs, and the width of the free legs may taper again from the connecting leg towards the free ends, the free legs having thus a trapezoidal shape in plan view, at least in portions.

For the opposite, second contact end which usually is adhered or soldered to an associated circuit board, for example the following embodiments are possible:

The end of the contacts opposite the respective contact portion may terminate on a second surface of the contacts carrier opposite the first surface of the contacts carrier. Here, that end of the contacts, also biassed, may be positioned against the corresponding second surface of the contacts carrier. In this way a coplanar alignment of the respective contact ends can be obtained.

The number of the contacts to be brought into contact with an associated smart card may vary according to the field of application and includes for example a group of six or eight contacts.

The contacts carrier may be formed having such a (first) group of contacts for contacting corresponding contacts of an associated smart card, but also having at least one contact disposed separately from the first group of contacts, which is formed as a switching contact for activating the contacts of the first group in the end position of the smart card. Said contact being designed as a switching contact may also be designed like the contacts of the first group of contacts.

According to another embodiment, the contact portion of the (at least one) switching contact projects beyond a surface of the contacts carrier, which is offset in height with respect to the first surface beyond which the contacts of the first group project, in forming a stopping edge for the chip card. This embodiment is also represented in the description of the figures below. Here, the switching contact is not actuated by the smart card but by a slide.

But a stopping edge defining the end position of a smart card may also be formed in the region of the surface of the contacts carrier for the first group of contacts.

Further characteristics of the invention follow from the features of the subclaims as well as the other application documents.

In the following, the invention is explained in more detail with an embodiment. Here, the figures show—each in schematic representation—:

DETAILED DESCRIPTION OF THE INVENTION

Figure 1:
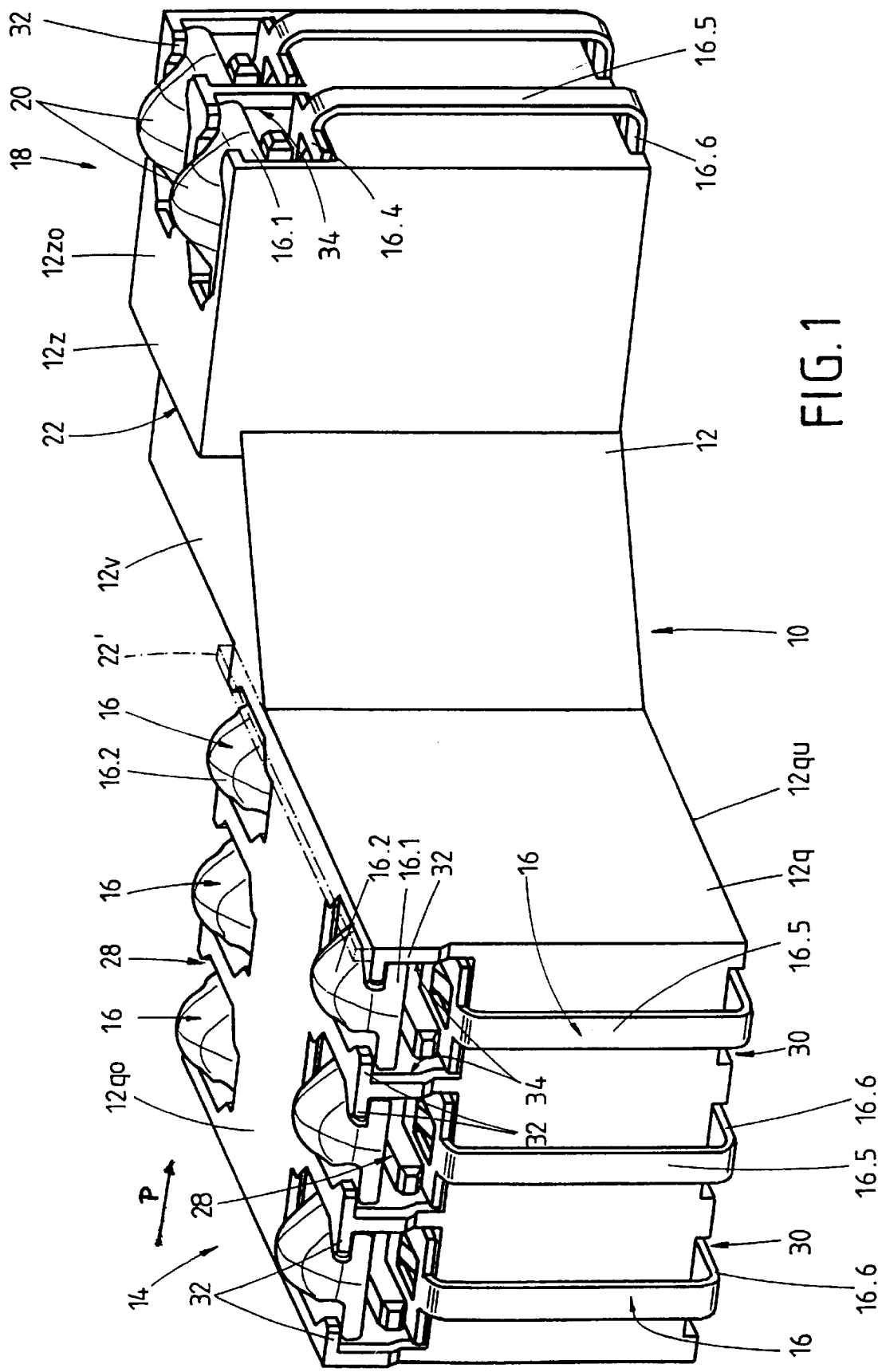
FIG. 1 a perspective view of a contacts carrier.

According to FIG. 1, the contacts carrier 10 consists of an insulating body 12 of a synthetic material, in which a first group 14 of six contacts 16 and a second group 18 of two contacts 20 are disposed.

The insulating body 12 comprises a first cuboidic portion 12$q$ which receives the first group 14 of contacts, a connecting portion 12$v$ joined thereto and a second cobuidic portion 12$z$ offset from the portion 12$q$, the lower surface of which is flush with the lower surface of the portion 12$q$, but the surface 12$zo$ of which projects beyond the surface 12$qo$ of the portion 12$q$, an edge 22 being formed thereby, which serves as a stopping edge for a smart card (not illustrated) being inserted in the direction of arrow P and defines the end position of the card. Said edge may also be formed in the region of the surface 12 qo, as illustrated in FIG. 1 in broken lines, having the reference number 22'.

The contacts 20 of the group 18 of contacts serve for indicating a locked condition or a readiness for reading of a smart card, the contacts 20 being actuated through a slide (not illustrated) lowering onto the contacts 20 in parallel to the supply of the chip card.

Here, the design of the contacts 20 and the contacting are analogous to the design of the contacts 16 as described below.

Figure 2:
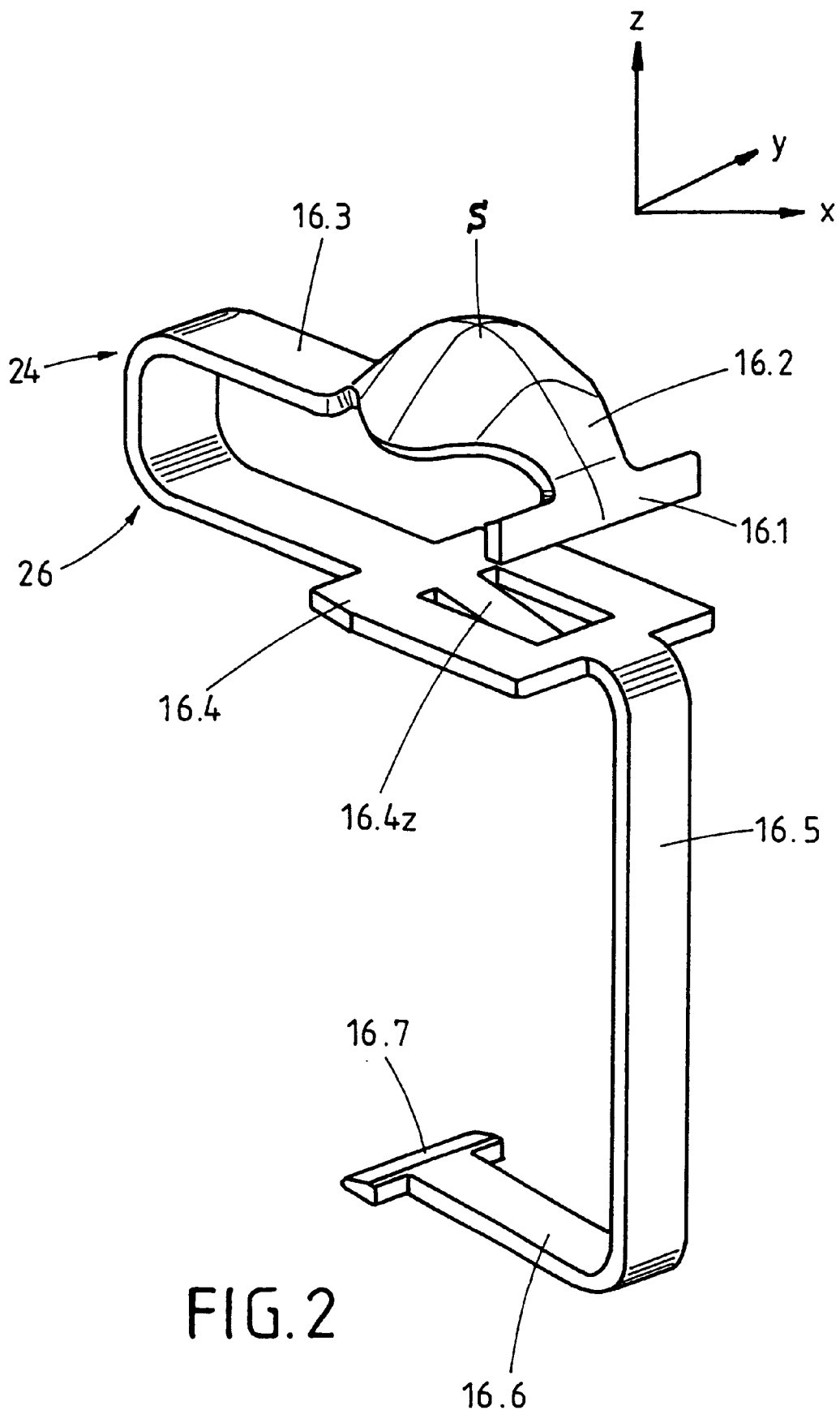
FIG. 2 a perspective view of a first contact.

As shown in FIG. 2, each contact 16 has a meander-like shape and consists of sheet metal formed like a spring, at least in its middle portion.

Each contact 16 has a transversal bridge 16.1 at its upper free end, to which a spoon-shaped contact portion 16.2 arched in two directions is joined, followed by a spring-like portion 16.3 doubly bent (at 24, 26), which widenes in a portion 16.4 about below the contact portion 16.2, then continues in a portion 16.5 bent by about 90° and, after a further bend of about 90°, terminates in a portion 16.6, which is limited at the end by a transversal bridge 16.7 which tapers in a wedge-like fashion towards the free end.

The insulating body 12 is designed in correspondence to the shape of the contacts 16. Accordingly, it comprises six indentations 28 opening to the surface 12$qo$ and to the side for receiving the portions 16.1 to 16.4 of the contacts 16, as well as slots 30 extending in parallel to the lower surface 12$qu$ on the lower side, which serve for receiving the portions 16.6, 16.7, a certain bias being obtained in this region through the wedge-like transversal bridge 16.7 in putting-on the respective contact 16, to arrange the portions 16.6 of the contacts 16 in a substantially coplanar manner.

In putting-on the contacts 16 on the side, the portions 16.1 to 16.4 are guided into the indentations 28, the following positioning or locking resulting therefrom:

The portion 16.4 mentioned above of the contact 16 has a tongue 16.4$z$ projecting downwardly in a resilient manner, catching in a corresponding recess within the indentation 28 as soon as the free end of the tongue 16.4$z$ has passed the recess.

In the region of the indentation 28, the portion 16.3 is guided within a corresponding groove so that it is movable neither in the direction of arrow x nor in the direction of arrow y, in cooperation with the tongue 16.4z. In inserting the contact 16, the transversal bridge 16.1 runs onto lateral noses 32 in the region of the indentation 28, not only a corresponding bias and positioning in the direction of arrow Z for the free end of the contact 16 but also at the same time a positioning of the contact 16 in the direction of arrow y by the lateral guide walls 34 in the region of the indentations 28 resulting therefrom.

In this embodiment, a smart card can be supplied in the x- as well as in the y-direction without having the risk that the contacts and especially their contact portions 16.2 shift laterally and make a reliable contact more difficult or event prevent it.

That makes it possible to insert the smart card for example offset by 90° with respect to the "usual" direction of supply of the smart card, as it is shown in FIG. 1 by the direction of arrow P.

The movability of the contacts 16 is limited in the direction of arrow z (FIG. 2), the corresponding z-axis extending through the vertex S of the contact portions 16.2 and thus orthogonally to the surface 12qo of the contacts carrier 10.

Figure 3:
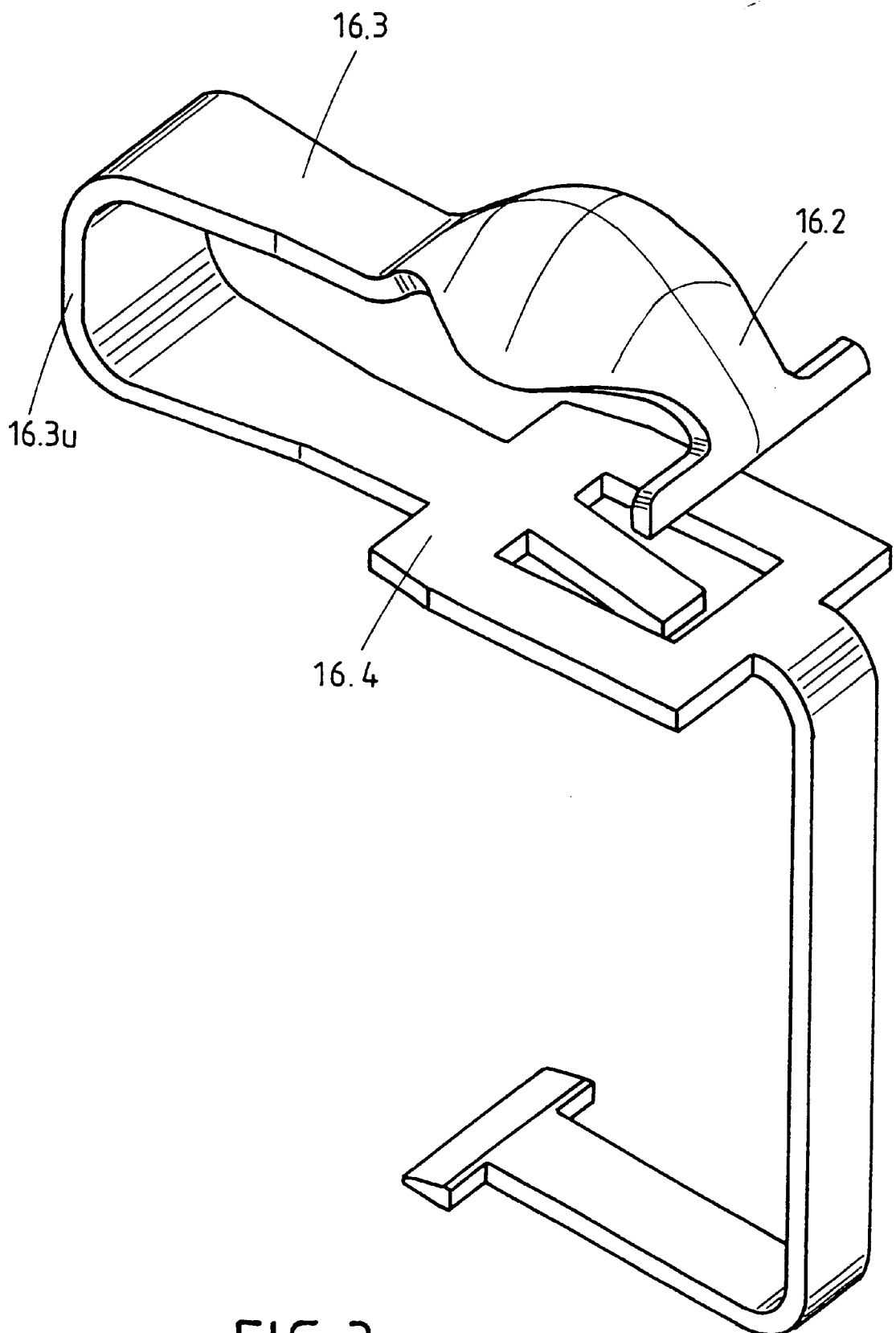
FIG. 3 a perspective view of a second contact.

In the embodiment according to FIG. 3 the contact 16 has a portion 16.3 widened with respect to the adjacent contact portions 16.2, 16.4, the widening enlarging in the direction towards the bent middle portion 16.3u and being constant in the region of the middle portions 16.3u.

We claim:

1. In combination:
   a contacts carrier including a first surface;
   a plurality of contacts,
   each of the contacts comprising a spoon-shaped arched contact portion having a convex shape in two orthogonal directions,
   the arched contact portion projecting beyond the first surface of the contacts carrier, wherein
   each contact includes at least one guide portion joined to the respective arched contact portion, and wherein
   each guide portion is slidably guided in the contacts carrier in such a manner that the contact portions are only movable in a substantially vertical direction through a vertex of the respective contact portion.

2. The contacts carrier according to claim 1, wherein
   a first guide portion is formed at one side of the contact portion of each contact and is positioned within a first guide seat of the contacts carrier, which guides the corresponding contact portion in the substantially vertical direction, and wherein
   a second guide portion is formed at the other side of the contact portion opposite the first guide portion, said second guide portion being positioned within a second guide seat of the contacts carrier, which guides the corresponding contact portion in the substantially vertical direction.

3. The contacts carrier according to claim 2, wherein the second guide portion extends orthogonally to the first guide portion.

4. The contacts carrier according to claim 2, wherein the contact portions with the joined guide portions are fabricated in the contacts carrier in a pre-stressed manner.

5. The contacts carrier according to claim 2, wherein each of the second guide portions of the contacts forms a free contact end.

6. The contacts carrier according to claim 1, wherein the contacts have a meandering shape, starting from their first end formed with the contact portion.

7. The contacts carrier according to claim 6, wherein the contacts are positioned via catch means in the contacts carrier along those portions not being contact and guide portions.

8. The contacts carrier according to claim 1, wherein the contacts terminate with their second end opposite the respective contact portion on a second surface of the contacts carrier, opposite the first surface of the contacts carrier.

9. The contacts carrier according to claim 8, wherein the second end of the contacts is positioned under pre-stress against the corresponding second surface of the contacts carrier.

10. The contacts carrier according to claim 1, having a stop in the region of the first surface for defining an end position of a supplied smart card.

11. The contacts carrier according to claim 1, having a first group of contacts for contacting corresponding contacts of an associated smart card and at least one contact being arranged separately from the first group of contacts, which is formed as a switching contact for activating the contacts of the first group in the end position of the smart card.

12. The contacts carrier according to claim 11, wherein the at least one switching contact extends being offset by 90° from the first group of contacts.

13. The contacts carrier according to claim 11, wherein the at least one switching contact has its contact portion projecting beyond a surface of the contacts carrier, which is offset in height with respect to the first surface beyond which the contacts of the first group project, forming a stopping edge for the smart card thereby.

14. The contacts carrier according to claim 1, wherein the contacts are arranged along those portions not being contact portions and guide portions in a mechanically fixed manner, at least alone a part of a length thereof.

15. The contacts carrier according to claim 1, wherein the contacts are wider between a region of connection to their contact portion and their end opposite the contact portion, at least in portions.

* * * * *